United States Patent
Kobayashi

(10) Patent No.: US 10,284,828 B2
(45) Date of Patent: May 7, 2019

(54) PROJECTION TYPE DISPLAY SYSTEM, PROJECTION-TYPE DISPLAY DEVICE, AND TIMING ADJUSTMENT METHOD

(71) Applicant: NEC Display Solutions, Ltd., Tokyo (JP)

(72) Inventor: Michio Kobayashi, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 0 days.

(21) Appl. No.: 15/558,967

(22) PCT Filed: Apr. 24, 2015

(86) PCT No.: PCT/JP2015/062563
§ 371 (c)(1),
(2) Date: Sep. 15, 2017

(87) PCT Pub. No.: WO2016/170686
PCT Pub. Date: Oct. 27, 2016

(65) Prior Publication Data
US 2018/0249137 A1  Aug. 30, 2018

(51) Int. Cl.
*H04N 9/31* (2006.01)
*G03B 21/14* (2006.01)
*G03B 21/20* (2006.01)

(52) U.S. Cl.
CPC ........... *H04N 9/3114* (2013.01); *G03B 21/14* (2013.01); *G03B 21/204* (2013.01); *H04N 9/312* (2013.01); *H04N 9/3194* (2013.01)

(58) Field of Classification Search
CPC ................ H04N 9/3114; G02B 26/008
See application file for complete search history.

(56) References Cited

U.S. PATENT DOCUMENTS 6,215,547 B1 * 4/2001 Ramanujan .............. B41J 2/465
355/32
2002/0003704 A1 * 1/2002 Ohmae ................ F21S 10/007
362/293

(Continued)

FOREIGN PATENT DOCUMENTS

JP   2005-300647 A   10/2005
JP   2007-248996 A    9/2007

(Continued)

OTHER PUBLICATIONS

International Search Report (ISR) (PCT Form PCT/ISA/210), in PCT/JP2015/062563, dated Jul. 14, 2015.
Japanese Decision to Grant a Patent, dated Sep. 27, 2018, in Japanese Application No. 2017-513938 and English Translation thereof.

*Primary Examiner* — Paulos M Natnael
(74) *Attorney, Agent, or Firm* — McGinn I. P. Law Group, PLLC.

(57) ABSTRACT

A projection-type display system has: a light-emitting wheel that, by rotating, sequentially supplies light excited by light emitted from a light source and transmitted or reflected light of light that is emitted by the light source; a color separation wheel that, by rotating, sequentially color-separates and supplies light output of the light-emitting wheel; an image-forming element that, in accordance with a picture signal, performs light modulation of the light supplied by the color separation wheel; a light detection unit that detects the light that has undergone light modulation; and control units that adjust the light modulation and rotation timing of the light-emitting wheel after adjusting the light modulation and rotation timing of the color separation wheel.

16 Claims, 6 Drawing Sheets

(56) References Cited

U.S. PATENT DOCUMENTS

| | | | | |
|---|---|---|---|---|
| 2006/0007407 A1* | 1/2006 | Matsui | G02B 26/008 |
| | | | 353/84 |
| 2009/0244495 A1* | 10/2009 | Ogawa | G02B 26/008 |
| | | | 353/84 |
| 2013/0088689 A1* | 4/2013 | Lin | G03B 21/204 |
| | | | 353/31 |
| 2013/0235352 A1* | 9/2013 | Hsu | G03B 21/14 |
| | | | 353/31 |
| 2014/0071407 A1* | 3/2014 | Takahashi | G03B 21/142 |
| | | | 353/31 |
| 2015/0264326 A1* | 9/2015 | Hayashi | H04N 9/3111 |
| | | | 348/760 |
| 2017/0347075 A1* | 11/2017 | Okuda | G02B 27/1006 |
| 2018/0136552 A1* | 5/2018 | Kobayashi | H05B 37/02 |

FOREIGN PATENT DOCUMENTS

| | | |
|---|---|---|
| JP | 2012-203262 A | 10/2012 |
| JP | 2012-212129 A | 11/2012 |
| JP | 2014-066973 A | 4/2014 |
| JP | 2014-142588 A | 8/2014 |
| JP | 2014-160227 A | 9/2014 |
| JP | 2014-186081 A | 10/2014 |
| JP | 2014-222317 A | 11/2014 |
| JP | 2014-240912 A | 12/2014 |
| JP | 2015-505976 A | 2/2015 |
| WO | 2012/127554 A1 | 9/2012 |

* cited by examiner

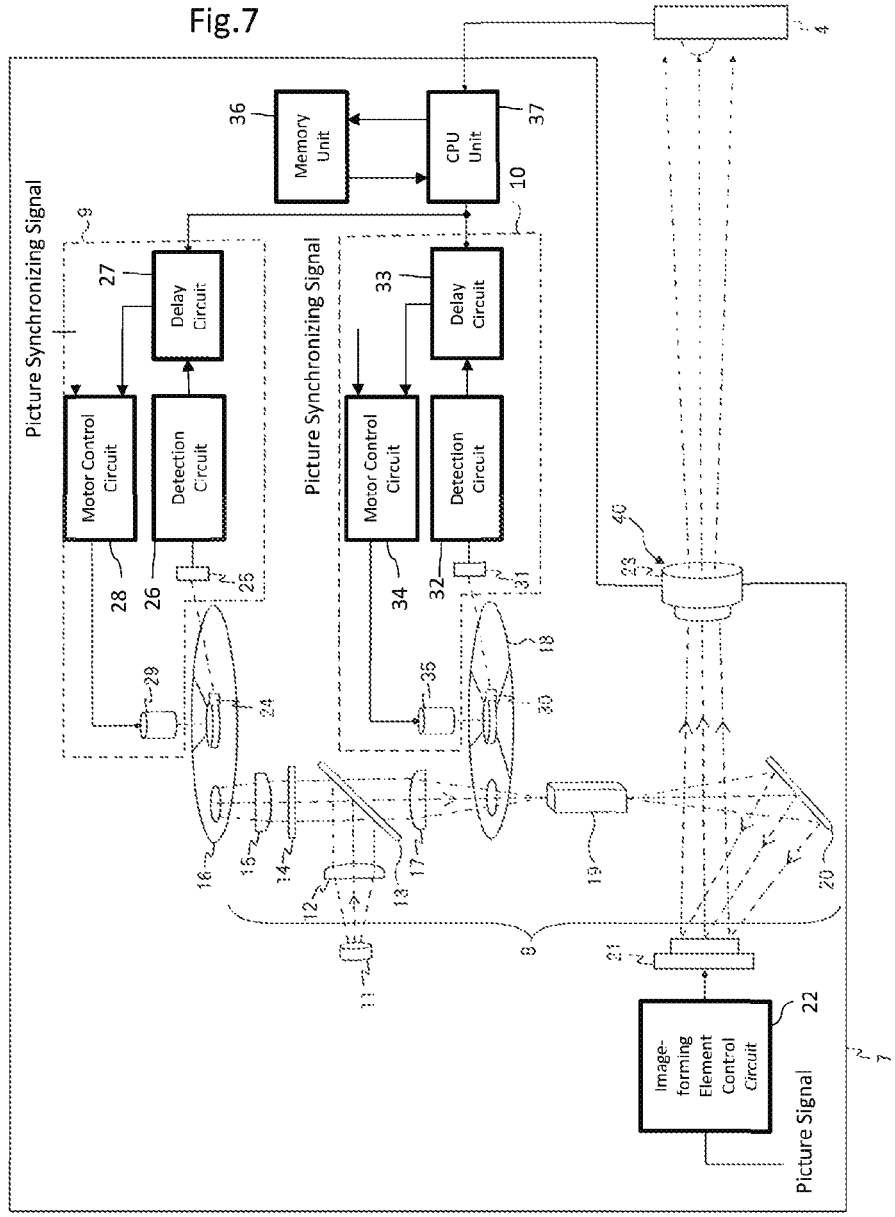

PROJECTION TYPE DISPLAY SYSTEM, PROJECTION-TYPE DISPLAY DEVICE, AND TIMING ADJUSTMENT METHOD

TECHNICAL FIELD

The present invention relates to a projection-type display system that is provided with a projection-type display device that projects a picture.

BACKGROUND ART

A projection-type display device (projector) configuration is known that uses a color separation wheel that rotates at high speed to sequentially separate white light that is emitted from a light source into light of the three primary colors of red, green, and blue and that sequentially light-modulates the colored light that is separated in accordance with a picture signal to form a color picture. The color separation wheel is also referred to as a "color wheel". A component such as a liquid crystal panel or DMD (Digital Micro-Mirror Device (registered trademark)) is used for the image-forming element.

A projection-type display device of the prior art that uses this type of color separation wheel is disclosed in, for example, Patent Document 1 (JP 2005-300647 A). In Patent Document 1, a method is described for synchronizing the light modulation of the light of each color by an image-forming element with the color separation realized by the color separation wheel.

Among projection-type display devices that use the above-described color separation wheel, most are conventionally of a configuration that uses, for example, a high-luminance discharge lamp as the light source. However, in recent years, projection-type display devices are being developed that use a semiconductor light-emitting element such as a laser diode or LED (light-emitting diode) as the light source for the purpose of obtaining lower power consumption and longer service life of the light source.

For example, Patent Document 2 (WO 2012/127554 A1) discloses a projection-type display device that uses a laser diode that emits laser light of the blue wavelength band as a light source and that irradiates the laser light upon a phosphor to generate light of the red wavelength band and green wavelength band.

The projection-type display device disclosed in Patent Document 2 includes a light emitting wheel that is provided with a red region in which is formed a phosphor that, when excited by laser light of the blue wavelength band, emits light of the red wavelength band, a green region in which is formed a phosphor that, when excited by laser light of the blue wavelength band, emits light of the green wavelength band, and a blue region in which a mirror is formed that reflects the light (laser light) of the blue wavelength band; and when laser light of the blue wavelength band is irradiated upon the light-emitting wheel that is rotating at high speed, sequentially supplies light of the blue wavelength band, red wavelength band, and green wavelength band. A color picture is then formed the sequential light modulation of the light of each color emitted from the light-emitting wheel in accordance with a picture signal.

In a configuration that uses the above-described phosphors to generate light of the red wavelength band and green wavelength band, the light emission efficiency may differ according to the phosphor. For example, it is known that when light of the green wavelength band and red wavelength band are generated from light of the blue wavelength band, the light emission efficiency of the phosphor that emits light of the red wavelength band is lower than that of the phosphor that emits light of the green wavelength band. As a result, methods are being investigated that, instead of using different phosphors to cause light emission of light of the green wavelength band and red wavelength band, cause light of the yellow wavelength band that includes light of the red wavelength band and green wavelength band to be emitted by a phosphor and then use a color filter to color-separate light of the red wavelength band and light of the green wavelength band from the light of the yellow wavelength band. In this case, a color separation wheel should be used to sequentially separate light of the red wavelength band and light of the green wavelength band from light of the yellow wavelength band that was generated by the light-emitting wheel.

If light of the yellow wavelength band is produced in this way and light of the red wavelength band and green wavelength band are separated from the light of the yellow wavelength band, the difference in the brightness of the light of each color that arises from the characteristics of the phosphor can be reduced. Further, if light of the yellow wavelength band is also used in picture display, the brightness of the projected picture can be improved, and the yellow color development in the projected picture (color picture) can also be improved. In the following explanation, the output of light by the light-emitting wheel that has been excited by the light emitted by the light source as well as the output of light due to the transmission or reflection of light emitted by the light source are also referred to as "light output by the light-emitting wheel.

However, in a configuration that uses a light-emitting wheel and a color separation wheel, a method has not been established to adjust the rotation timing of the color separation wheel and light-emitting wheel that rotate at high speed with respect to the timing of the light modulation by an image-forming element.

RELATED ART DOCUMENTS

Patent Documents

Patent Document 1: JP 2005-300647 A
Patent Document 2: WO 2012/127554 A1

SUMMARY

Problem to be Solved by the Invention

The present invention has as its object the provision of a projection-type display system, a projection-type display device, and a timing adjustment method that enable the easy adjustment of the rotation timing of a light-emitting wheel and color separation wheel with respect to light modulation timing realized by an image-forming element.

The projection-type display system according to an exemplary aspect of the present invention for achieving the above-described object includes:

a light-emitting wheel, by rotating, sequentially supplies light that is excited by light that is emitted by a light source and light that is the transmission or reflection of light that is emitted by the light source;

a color separation wheel that, by rotating, sequentially color-separates and supplies light that is supplied by the light-emitting wheel;

an image-forming element that, in accordance with a picture signal, performs light modulation of light supplied by the color separation wheel;

a light detection unit that detects light that has undergone light modulation; and a control unit that, on the basis of the output of the light detection unit, adjusts the light modulation and the rotation timing of the light-emitting wheel after adjusting the light modulation and rotation timing of the color separation wheel.

The projection-type display device according to an exemplary aspect of the present invention is provided with:

a light-emitting wheel, by rotating, sequentially supplying light that is excited by light that is emitted by a light source and light that is the transmission or reflection of light that is emitted by the light source;

a color separation wheel that, by rotating, sequentially color-separates and supplies light that is supplied by the light-emitting wheel; and an image-forming element that, in accordance with a picture signal, performs light modulation of light that is supplied by the color separation wheel;

the projection-type display device being of a configuration in which, on the basis of the output of a light detection unit that detects light that has undergone the light modulation, the light modulation and rotation timing of the light-emitting wheel being adjusted after the light modulation and rotation timing of the color separation wheel have been adjusted.

The timing adjustment method according to an exemplary aspect of the present invention is a method that includes steps of:

a light-emitting wheel, by rotating, sequentially supplying light that is excited by light that is emitted by a light source and light that is the transmission or reflection of light that is emitted by the light source;

a color separation wheel, by rotating, sequentially color-separating and supplying light that is supplied by the light-emitting wheel;

an image-forming element, in accordance with a picture signal, performing light modulation of light that is supplied by the color separation wheel;

a light detection unit detecting light that has undergone the light modulation; and on the basis of the output of the light detection unit, adjusting the light modulation and rotation timing of the color separation wheel and then, on the basis of the output of the light detection unit, adjusting the light modulation and rotation timing of the light-emitting wheel.

Effect of the Invention

According to the present invention, a projection-type display device is obtained that allows the easy adjustment of the rotation timing of a light-emitting wheel and a color separation wheel with respect to the timing of light modulation by an image-forming element.

BRIEF DESCRIPTION OF THE DRAWINGS

FIG. 7 is a block diagram showing an example of the configuration of the projection-type display system of the second exemplary embodiment.

EXEMPLARY EMBODIMENT

The present invention is next described with reference to the drawings.

First Exemplary Embodiment

Figure 1:
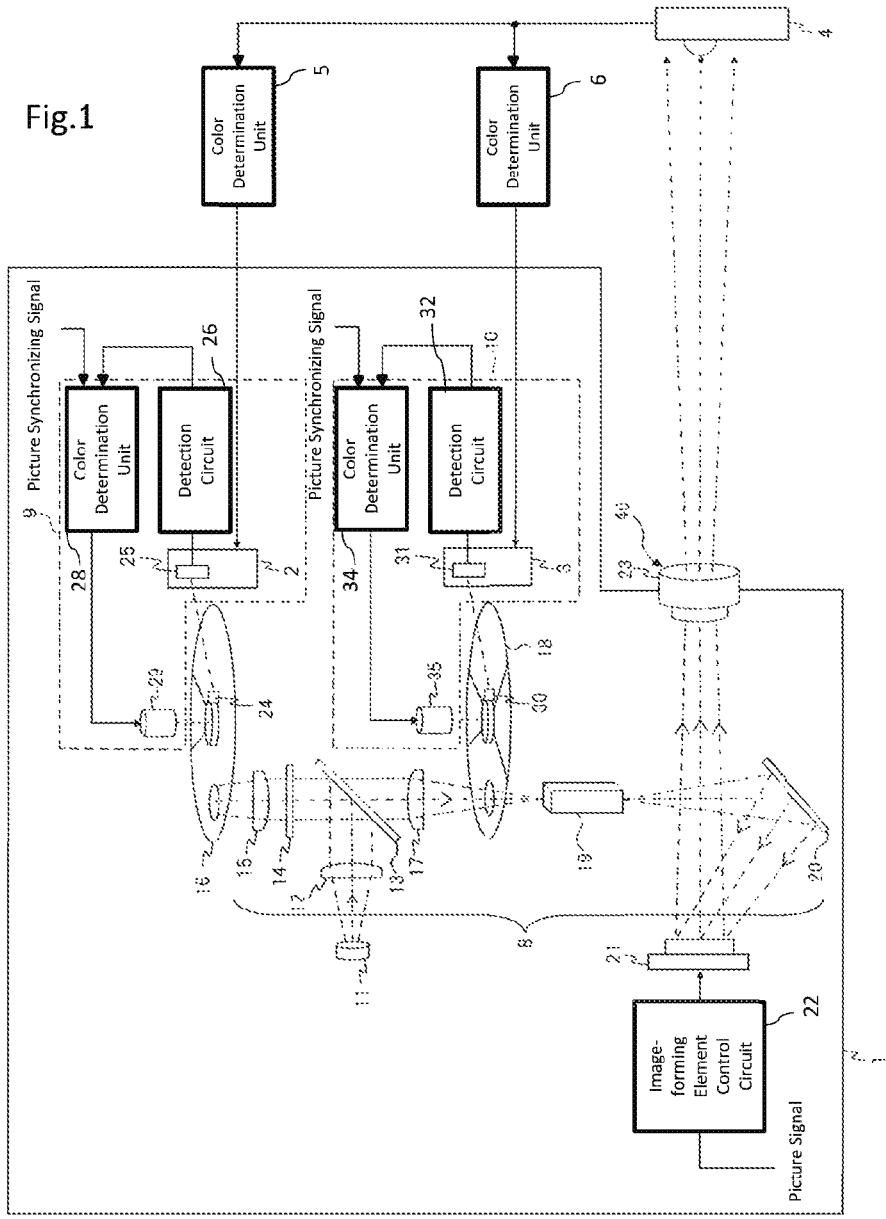
FIG. 1 is a block diagram showing an example of the configuration of the projection-type display system of the first exemplary embodiment.

FIG. 1 is a block diagram showing an example of the configuration of the projection-type display system of the first exemplary embodiment. FIG. 1 shows an example of the configuration of a projection-type display system that is provided with a DLP (Digital Light Processing) projection-type display device that uses a DMD (Digital Micro-Mirror Device (registered trademark)) as an image-forming element. The projection-type display system of the present invention can also be adapted to a liquid crystal projection-type display device that uses a liquid crystal panel as an image-forming element.

As shown in FIG. 1, the projection-type display system of the first exemplary embodiment has: projection-type display device 1 that projects a picture that is indicated by a picture signal that is supplied from the outside, color detector 4 that measures the color of the light that is projected from projection-type display device 1; first color determination unit 5 that, on the basis of the measurement result of color detector 4, supplies a control signal for adjusting the rotation timing of the light-emitting wheel provided in projection-type display device 1; and second color determination unit 6 that, on the basis of the measurement result of color detector 4, supplies a control signal for adjusting the rotation timing of the color separation wheel provided in projection-type display device 1.

Color detector 4 is a known sensor that supplies a chromaticity value (x-y chromaticity coordinate value) that corresponds to the color of the light that was photo-detected. Color detector 4 is an example of the light detection unit. The light detection unit detects light that has undergone light modulation by the image-forming element. More specifically, the light detection unit detects the color of light that has undergone light modulation by the image-forming element.

By means of the above-described control signal, first color determination unit 5 causes movement of first photo-interrupter 25 provided in projection-type display device 1 (to be described) to adjust the rotation timing of a light-emitting wheel with respect to the timing of light modulation such that the chromaticity value supplied from color detector 4 becomes a predetermined value. By means of the above-described control signal, second color determination unit 6 causes movement of second photo-interrupter 31 that is provided in projection-type display device 1 (to be described) to adjust the rotation timing of the color separation wheel with respect to the timing of the light modulation such that the chromaticity value supplied from color detector 4 becomes a predetermined value. The rotation timing of the light-emitting wheel is adjusted by changing the phase (rotation angle) of the light-emitting wheel that is rotating. Similarly, the rotation timing of the color separation wheel is adjusted by changing the phase (rotation angle) of the color separation wheel that is rotating. First color determination unit 5 and second color determination unit 6 can be realized by, for example, an information processing device (computer) that includes a CPU (Central Processing Unit), a memory that temporarily holds information that is processed in the CPU, and a recording medium on which is saved a program and data for causing the CPU to execute a process.

The information processing device (computer) is an example of the control unit. First color determination unit 5 and second color determination unit 6 (control units) and/or color detector 4 may be incorporated in projection-type display device 1 or may be disposed outside projection-type display device 1. In addition, although FIG. 1 shows an example of a configuration in which first color determination unit 5 and second color determination unit 6 are each provided separately, the functions of first color determination unit 5 and second color determination unit 6 may also be realized by one color determination unit.

A projection-type display device 1 has: light source 11; light-emitting wheel 16 that sequentially supplies light that is excited by light emitted by light source 11 and light that is emitted by light source 11 that has been transmitted or reflected; first wheel control unit 9 that controls the rotational movement of light-emitting wheel 16; color separation wheel 18 that sequentially separates light of each color required for forming a color picture from light that is supplied from light-emitting wheel 16; second wheel control unit 10 that controls the rotational movement of color separation wheel 18; image-forming element 21 that, by performing light modulation of light that is irradiated by way of color separation wheel 18 in accordance with a picture signal that is received as input from the outside, forms image light that is indicated by the picture signal; image-forming element control circuit 22 that causes image-forming element 21 to operate in accordance with the picture signal; illumination optical system 8 that both guides light emitted from light source 11 to light-emitting wheel 16 and guides light supplied from light-emitting wheel 16 up to the surface of image-forming element 21; and projection optical system 40 that enlarges and projects the image light that was formed at image-forming element 21 upon, for example, a screen.

A laser diode that emits laser light of, for example, the blue wavelength band, is used for light source 11.

Illumination optical system 8 is provided with first lens 12, first reflecting mirror 13, quarter-wave plate 14, second lens 15, third lens 17, light pipe 19, and second reflecting mirror 20.

First reflecting mirror 13 both changes the light path of light emitted from light source 11 to irradiate light-emitting wheel 16 and transmits light emitted or reflected at light-emitting wheel 16 to irradiate color separation wheel 18. Quarter-wave plate 14 is provided for causing first reflecting mirror 13 to transmit by altering the plane of polarization of light that is reflected or transmitted by light-emitting wheel 16. First lens 12, second lens 15, and third lens 17 condense and diffuse light that is emitted from light source 11 to irradiate the surfaces of light-emitting wheel 16 and color separation wheel 18. Light pipe 19 equalizes and transmits the luminance distribution of light that has been transmitted through color separation wheel 18. Second reflecting mirror 20 irradiates light that has been transmitted through light pipe 19 upon the surface of image-forming element 21.

Illumination optical system 8 is not limited to the configuration shown in FIG. 1, and may be of any configuration that can both guide light emitted from light source 11 to light-emitting wheel 16 and guide the light reflected or emitted by light-emitting wheel 16 through color separation wheel 18 and to image-forming element 21.

Projection optical system 40 is provided with projection lens 23.

A known DMD (Digital Micro-Mirror Device (Registered trademark)) or liquid crystal panel is used for image-forming element 21. Image-forming element 21 performs sequential light modulation of light (light of each color) that is supplied by color separation wheel 18 in accordance with a picture signal that is received as input to form image light. As described hereinabove, FIG. 1 shows an example of a configuration that uses a DMD for image-forming element 21.

In accordance with a picture signal that is supplied from the outside and by means of micro-mirrors (cells in the case of a liquid crystal panel) that are provided in image-forming element 21, image-forming element control circuit 22 forms image light by subjecting light that is irradiated by way of color separation wheel 18 to light modulation that reflects (or transmits) in picture element units.

Figure 2:
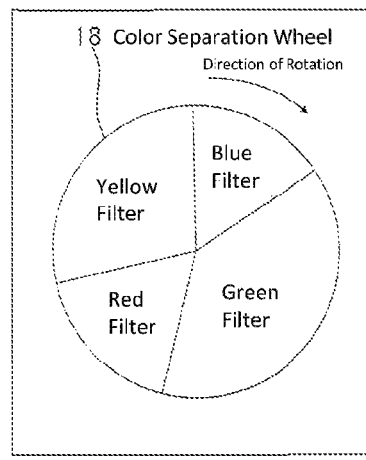
FIG. 2 is a schematic view showing an example of the configuration of the color separation wheel shown in FIG. 1.

As shown in FIG. 2, color separation wheel 18 is provided with: a blue filter that transmits light of the blue wavelength band; a yellow filter that transmits light of the yellow wavelength band that includes light of the red wavelength band and light of the green wavelength band; a red filter that transmits light of the red wavelength band; and a green filter that transmits light of the green wavelength band.

Color separation wheel 18 of the present exemplary embodiment is arranged such that color filters that transmit colored light that is used in the timing adjustment of color separation realized by color separation wheel 18 (to be described) and color filters that transmit colored light that is used in the timing adjustment of the light supplied by light-emitting wheel 16 are not adjacent. In other words, if the wavelength of light emitted by light source 11 is taken as the first wavelength band and the wavelength of light that is excited by the light emitted by light source 11 is taken as the second wavelength band, color separation wheel 18 has at least a first region that produces light of the first wavelength band and a third region that separates light of a third wavelength band that is contained in the second wavelength band and is arranged such that the first region and the third region are not adjacent. For example, when blue light that is emitted from light source 11 is used in the timing adjustment of light-emitting wheel 16, red light or green light is used in the timing adjustment of color separation wheel 18. Accordingly, when red light is used in the timing adjustment of color separation wheel 18, the red filter and blue filter are arranged so as not to be adjacent in color separation wheel 18. Alternatively, when green light is used in the timing adjustment of color separation wheel 18, the green filter and blue filter are arranged so as not to be adjacent in color separation wheel 18. First color determination unit 5 and second color determination unit 6 (control units) adjust the light modulation and rotation timing of color separation wheel 18 on the basis of the color that corresponds to the third wavelength band and adjust the light modulation and rotation timing of light-emitting wheel 16 on the basis of the color that corresponds to the first wavelength band.

As described above, color separation wheel 18 may have a second region and a fourth region that are adjacent to the above-described third region and that each produce wavelength bands that are contained in the second wavelength band, and moreover, that contain a wavelength other than the third wavelength band. The second region, the third region, and the fourth region are irradiated by light that is supplied by light-emitting wheel 16 that is excited by light emitted by a light source. More specifically, the second region is a yellow filter through which light of the yellow wavelength band (second wavelength band) is transmitted. In addition, when the third region is a red filter, the fourth region is a green filter, and when the third region is a green filter, the fourth region is a red filter.

An example in which red light is used in the timing adjustment of color separation wheel 18 is next described. FIG. 2 shows an example in which a red filter and a blue filter are arranged so as not to be adjacent.

A diffusion plate that transmits and diffuses light of the blue wavelength band may be used in place of a blue filter in the above-described first region of color separation wheel 18 such that laser light of the blue wavelength band that is emitted from light source 11 is not emitted unaltered from projection lens 23. The diffusion plate if may transmit light of the blue wavelength band that is emitted from light source 11 and does not need to have a filter capability. In addition, a color filter that blocks the blue wavelength band may be provided in place of the above-described yellow filter in color separation wheel 18. Second reflective marker 30 (second detected portion) having high reflectance that indicates a reference position (reference angle) of color separation wheel 18 is fixed in the vicinity of the axis of rotation of color separation wheel 18.

Figure 3:
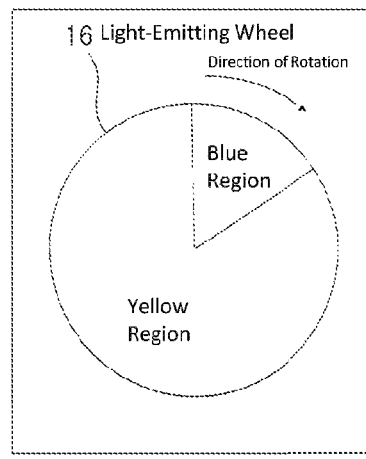
FIG. 3 is a schematic view showing an example of the configuration of the light-emitting wheel shown in FIG. 1.

As shown in FIG. 3, light-emitting wheel 16 is provided with a yellow region in which a phosphor (light-emitting unit) is formed that takes light of the blue wavelength band that is emitted from light source 11 as excitation light and that emits light of a yellow wavelength band that contains light of the red wavelength band and green wavelength band; and a blue region in which a mirror (non-light-emitting unit) is formed that reflects light of the blue wavelength band. First reflective marker 24 (first detected portion) having high reflectance that indicates a reference position (reference angle) of this light-emitting wheel 16 is fixed in the vicinity of the axis of rotation of light-emitting wheel 16.

FIG. 1 shows an example of projection-type display device 1 that is provided with illumination optical system 8 in which the blue wavelength band that is emitted from light source 11 is reflected at light-emitting wheel 16, and further, transmitted through color separation wheel 18 and guided to image-forming element 21, but illumination optical system 8 of projection-type display device 1 is not limited to the configuration shown in FIG. 1. For example, light-emitting wheel 16 may also be of a configuration that transmits light of the blue wavelength band that is emitted from light source 11, or color separation wheel 18 may be of a configuration that reflects light of the blue wavelength band. Still further, color separation wheel 18 may be of a configuration that separates light of the red wavelength band or light of the green wavelength band by reflecting light of a predetermined wavelength band from light of the yellow wavelength band. Illumination optical system 8 of projection-type display device 1 may be designed as appropriate according to the reflection or transmission of light of the blue wavelength band by light-emitting wheel 16 and color separation wheel 18.

First wheel control unit 9 is provided with: first drive motor 29 in which light-emitting wheel 16 is secured to the axis of rotation; first timing adjustment unit 2 that is provided with first photo-interrupter 25; first detection circuit 26 that uses first photo-interrupter 25 to detect first reflective marker 24 that is provided on light-emitting wheel 16; and first motor control circuit 28 that causes first drive motor 29 to rotate on the basis of a picture synchronizing signal received as input from the outside together with the picture signal and the output signal of first detection circuit 26. First photo-interrupter 25 is a sensor in which a light-emitting element and a photo-detection element are integrated and that outputs a signal when light emitted from the light-emitting element is reflected by first reflective marker 24 and the reflected light then photo-detected by the photo-detection element. First detection circuit 26, upon detecting the signal supplied from the photo-detection element of first photo-interrupter 25, supplies the signal as a synchronizing signal to first motor control circuit 28.

First reflective marker 24 is an example of the first detected portion. To state in greater detail, first detected portion is fixed to light-emitting wheel 16. First photo-interrupter 25 is an example of the first detection unit. To state in greater detail, first detection unit is of a configuration that outputs a signal upon detecting the first detected portion (first reflective marker 24) and that is movable along the direction of rotation of light-emitting wheel 16. First wheel control unit (first rotation control unit) 9 causes light-emitting wheel 16 to rotate such that the output signal of first detection circuit 26 is synchronized with the picture synchronizing signal that is received as input together with the picture signal. In other words, first motor control circuit 28 controls the rotational speed of first drive motor 29 such that the phase difference between the picture synchronizing signal (for example, a vertical synchronizing signal) that is received as input together with the picture signal and the synchronizing signal that is supplied from first detection circuit 26 is uniform (such that the signals are synchronized).

First timing adjustment unit 2 is a component for adjusting the physical position of first photo-interrupter 25 that detects first reflective marker 24 and is of a configuration that is provided with a movable table (not shown in the figures) on which first photo-interrupter 25 is mounted and a drive mechanism (not shown in the figures) that causes the movable table to move along the direction of rotation of light-emitting wheel 16 in accordance with a control signal that is supplied from first color determination unit 5. The drive mechanism that is provided in first timing adjustment unit 2 may be of any configuration that is able to move the movable table on which first photo-interrupter 25 is mounted in accordance with a control signal from first color determination unit 5.

Second wheel control unit 10 is provided with: second drive motor 25 in which color separation wheel 18 is secured to the axis of rotation; second timing adjustment unit 3 that is provided with second photo-interrupter 31; second detection circuit 32 that uses second photo-interrupter 31 to detect second reflective marker 30 that is provided on color separation wheel 18; and second motor control circuit 34 that causes second drive motor 35 to rotate on the basis of a picture synchronizing signal that is received as input from the outside together with the picture signal and the output signal of second detection circuit 32. Second photo-interrupter 31 is a sensor in which a light-emitting element and a photo-detection element are integrated. Second photo-interrupter 31 supplies a signal when light that is emitted from the light-emitting element is reflected by second reflective marker 30 and then when the reflected light is photodetected by the photo-detection element. Upon detecting the signal that is supplied from the photo-detection element of second photo-interrupter 31, second detection circuit 32 supplies the signal to second motor control circuit 34 as a synchronizing signal.

Second reflective marker 30 is an example of the second detected portion. To state in greater detail, second detected portion is fixed to color separation wheel 18. Second photo-interrupter 31 is an example of the second detection unit. To state in greater detail, the second detection unit is of a configuration that supplies a signal upon detecting the second detected portion (second reflective marker 30) and that is movable along the direction of rotation of color separation wheel 18. Second wheel control unit (second rotation control unit) 10 causes color separation wheel 18 to rotate such that the picture synchronizing signal and the output signal of second detection circuit 32 are synchronized. In other words, second motor control circuit 34 controls the speed of rotation of second drive motor 35 such that the phase difference between the picture synchronizing signal (for example, a vertical synchronizing signal) that is received as input together with the picture signal and the synchronizing signal that is supplied from second detection circuit 32 is uniform (such that the signals are synchronized). Second timing adjustment unit 3 is a component to adjust the physical position of second photo-interrupter 31 that detects second reflective marker 35 and is of a configuration that is provided with a movable table (not shown) on which second photo-interrupter 31 is mounted and a drive mechanism (not shown) that causes the movable table to move along the direction of rotation of color separation wheel 18 in accordance with a control signal that is supplied from second color determination unit 6. The drive mechanism that is provided in second timing adjustment unit 3 may be of any configuration that is capable of moving the movable table on which second photo-interrupter 31 is mounted in accordance with the control signal from second color determination unit 6.

The timing adjustment method of the present invention to adjust the timing of the light output realized by light-emitting wheel 16 as well as the color separation realized by color separation wheel 18 with respect to the light modulation realized by image-forming element 21 in a configuration of this type is next described using the accompanying drawings.

Figure 4:
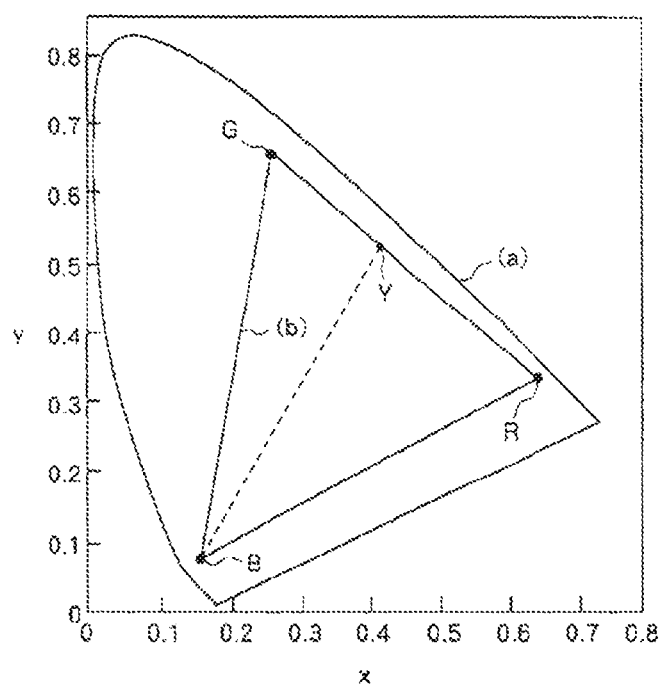
FIG. 4 is a chromaticity diagram showing on x-y chromaticity coordinates colors of light of the visible wavelength band and colors that can be reproduced by a projection-type display device.
Figure 5:
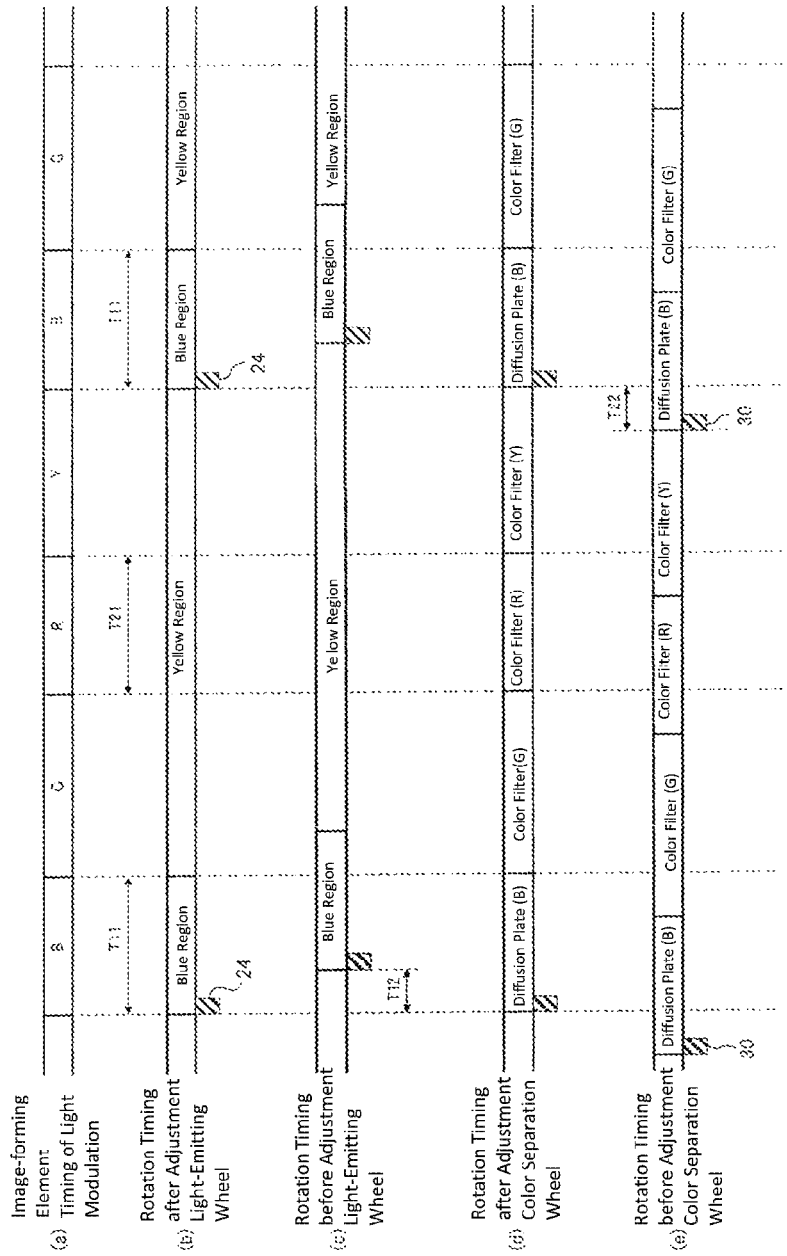
FIG. 5 is a graph showing an example of the timing of a picture signal, the light output realized by a light-emitting wheel, and the color separation realized by a color separation wheel.

The principles of the timing adjustment method of the present invention are first described using FIGS. 4 and 5.

FIG. 4 is a chromaticity diagram showing, on x-y chromaticity coordinates, colors of light of the visible wavelength band and colors that can be reproduced by a projection-type display device. Curve (a) shown in FIG. 4 is a single-color spectrum track and all colors in the visible wavelength band are present within region (a) shown in FIG. 4. On the other hand, in projection-type display device 1 that reproduces a color picture by the set of red light, green light, and blue light, the reproducible range of color is the region shown by triangle (b) of FIG. 4. In other words, the chromaticity values of color that can be reproduced in projection-type display device 1 are present within the range of triangle (b) that takes as apices chromaticity value R of light of a color that is transmitted through red filter of color separation wheel 18, chromaticity value G of light of a color that is transmitted through a green filter, and chromaticity value B of light of a color that is transmitted through a blue filter (diffusion plate). Chromaticity value Y of light of the yellow wavelength band that is emitted by light-emitting wheel 16 is on the line that joins points R and G of FIG. 4.

Accordingly, at the time of light modulation of red light realized by image-forming element 21, if only red light that has been transmitted through the red filter of color separation wheel 18 is irradiated upon image-forming element 21, the chromaticity value of point R of FIG. 4 is detected in color detector 4. Similarly, if only light of the color that is transmitted through the green filter of color separation wheel 18 is irradiated upon image-forming element 21 at the time of light modulation of green light by image-forming element 21, the chromaticity value of point G of FIG. 4 is detected in color detector 4. Further, if only light of the color that is transmitted through the blue filter of color separation wheel 18 is irradiated upon image-forming element 21 at the time of light modulation of blue light by image-forming element 21, the chromaticity value of point B of FIG. 4 is detected in color detector 4.

On the other hand, when light of a color other than red is irradiated upon image-forming element 21 at the time of light modulation of red light by image-forming element 21, the chromaticity value that is detected by color detector 4 transitions in the direction of point G or point B from point R shown in FIG. 4. Similarly, when light of a color other than green is irradiated upon image-forming element 21 at the time of light modulation of green light by image-forming element 21, the chromaticity value that is detected by color detector 4 transitions in the direction point R or point B from point G shown in FIG. 4. Further, when light of a color other than blue is irradiated upon image-forming element 21 at the time of light modulation of blue light by image-forming element 21, the chromaticity value detected by color detector 4 transitions in the direction of point R or in the direction of point G from point B shown in FIG. 4.

Consequently, in order to synchronize light modulation realized by image-forming element 21 and color separation realized by color separation wheel 18 at the time of light modulation of light of a predetermined color by image-forming element 21, the phase (rotation angle) of color separation wheel 18 should be adjusted such that the chromaticity value that is detected by color detector 4 becomes the chromaticity value that corresponds to that light color. In other words, when a picture signal that projects an image of only the color that corresponds to the above-described third wavelength band is applied as input to image-forming element 21, second color determination unit 6 (control unit) adjusts the rotation timing of color separation wheel 18 with respect to the light modulation such that the color that is detected by color detector (light detection unit) 4 becomes the color that corresponds to the third wavelength band. For example, at the time of light modulation of red light by means of image-forming element 21, second color determination unit 6 adjusts the phase (angle of rotation) of rotating color separation wheel 18 such that the chromaticity value that is detected by color detector 4 becomes point R (the x value is the maximum) of FIG. 4.

Similarly, in order to synchronize light modulation realized by image-forming element 21 and light output by light-emitting wheel 16, the phase (rotation angle) of light-emitting wheel 16 should be adjusted at the time of light modulation of light of a predetermined color by image-forming element 21 such that the chromaticity value that is detected by color detector 4 is the chromaticity value that corresponds to light of that color. In other words, when a picture signal that projects the image of only the color that corresponds to the above-described first wavelength band is applied as input to image-forming element 21, first color determination unit 5 adjusts the rotation timing of light-emitting wheel 16 with respect to the light modulation such that the color detected by color detection unit (light detection unit) 4 is the color that corresponds to the first wavelength band. Here, because the emitted light of light source 11 is in the blue wavelength band, the phase (rotation angle) of rotating light-emitting wheel 16, for example, at the time of light modulation by means of image-forming element 21, is adjusted such that the chromaticity value that is detected by color detector 4 becomes point B (the x value is a minimum).

However, if color separation wheel 18 is not already adjusted at the time of adjusting the timing of light-emitting wheel 16, the amount of divergence of the phase (rotation angle) of color separation wheel 18 will be included in the phase (rotation angle) of light-emitting wheel 16 that follows adjustment. As a result, the timing adjustment of light-emitting wheel 16 will again need to be carried out after adjustment of the timing of color separation wheel 18. On the other hand, because the yellow region that emits light of the yellow wavelength band occupies a larger area of light-emitting wheel 16 than the blue area that reflects light of the blue wavelength band as shown in FIG. 3, if light modulation of red light is carried out by image-forming element 21 at the time of the timing adjustment of color separation wheel 18, there will be virtually no effect upon the adjustment of color separation wheel 18 despite the occurrence of some divergence in the phase (rotation angle) of light-emitting wheel 16. In particular, because the red filter is arranged so as not to be adjacent to the blue filter on color separation wheel 18 (see FIG. 2), using the red light enables a greater reduction of the effect upon the timing adjustment of color separation wheel 18. Here, in the present invention, the timing adjustment of color separation wheel 18 is executed first, following which the timing adjustment of the light-emitting wheel 16 is carried out.

The phase (rotation angle) of light-emitting wheel 16 can be adjusted by moving first photo-interrupter 25 that is provided in first timing adjustment unit 2 shown in FIG. 1, and the phase (rotation angle) of color separation wheel 18 can be adjusted by moving second photo-interrupter 31 that is provided in second timing adjustment unit 3 shown in FIG. 1.

As described hereinabove, first motor control circuit 28 causes light-emitting wheel 16 to rotate such that the phase difference between the picture synchronizing signal and the synchronizing signal that indicates the detection timing of first reflective marker 24 by first photo-interrupter 25 is uniform. As a result, if first photo-interrupter 25 is moved, first motor control circuit 28 delays (or advances) the phase of light-emitting wheel 16 in accordance with the synchronizing signal that corresponds to the position of first photo-interrupter 25 after movement. In other words, the phase (rotation angle) of light-emitting wheel 16 can be adjusted.

Similarly, second motor control circuit 34 rotates color separation wheel 18 such that the phase difference between the picture synchronizing signal and the synchronizing signal that indicates the detection timing of second reflective marker 30 realized by second photo-interrupter 31 is uniform. As a result, if second photo-interrupter 31 is moved, second motor control circuit 34 delays (or advances) the phase of color separation wheel 18 in accordance with the synchronizing signal that corresponds to the position of second photo-interrupter 31 after movement. In other words, the phase (rotation angle) of color separation wheel 18 can be adjusted.

An example of a picture signal for light modulation in image-forming element 21, the timing of the light output realized by light-emitting wheel 16, and the timing of color separation realized by color separation wheel 18 is here shown in FIG. 5. FIG. 5 shows an example in which first reflective marker 24 is secured to the starting position of the blue region (reflected light (B)) as the reference position of light-emitting wheel 16 and second reflective marker 30 is secured to the starting position of the blue filter (or diffusion plate (B)) as the reference position of color separation wheel 18.

FIG. 5(*a*) shows the timing of the light modulation that is realized by the image-forming element. For example, interval B is the display interval in which the blue picture that corresponds to blue light is displayed and the image-forming element is driven by the blue picture signal. The G interval is the display interval in which a green picture that corresponds to green light is displayed and the image-forming element is driven by the green picture signal. The R interval is the display interval in which a red picture that corresponds to red light is displayed and the image-forming element is driven by the red picture signal. Further, the Y interval is the display interval in which a yellow picture that corresponds to yellow light is displayed and the image-forming element is driven by the yellow picture signal.

A blue region of width that corresponds to the B (blue) interval and a yellow region of width that corresponds to the G (green), R (red), and Y (yellow) intervals are assumed to have been formed in advance on light-emitting wheel 16. In other words, when light-emitting wheel 16 is caused to rotate such that the light modulation interval of one frame according to a picture signal coincides with the interval in which light-emitting wheel 16 makes one rotation, light-emitting wheel 16 sequentially reflects or emits light of each of the colors (B and Y) in widths (intervals) that correspond to the light modulation of the light of each color. However, the rotation of light-emitting wheel 16 before adjustment is here assumed to be delayed by phase (rotation angle) that corresponds to interval T12 with respect to the picture signal (FIG. 5(*c*)).

Further, a blue filter (diffusion plate (B)) of width that corresponds to the B (blue) interval, a color filter (G) of width that corresponds to the G (green) interval, a color filter (R) of width that corresponds to the R (red) interval, and a color filter (Y) of width that corresponds to the Y interval are assumed to have been formed in advance on color separation wheel 18. In other words, when color separation wheel 18 is caused to rotate such that a light modulation interval of one frame according to the picture signal coincides with the interval of a single rotation of color separation wheel 18, light of each of the colors (B, G, R, and Y) is sequentially emitted from color separation wheel 18 in widths (intervals) that correspond to the light modulation of the light of each color. However, the rotation of color separation wheel 18 before adjustment is here assumed to be advanced by phase (rotation angle) that corresponds to interval T22 with respect to the picture signal (FIG. 5(*e*)).

The light modulation of red light by the above-described image-forming element 21 refers to the state in which red light is projected from projection lens 23 due to the reflection of irradiated light toward projection lens 23 by image-forming element 21 in the R (red) interval shown in FIG. 5(*a*) and irradiated light is not reflected toward projection lens 23 by image-forming element 21 in other intervals. Similarly, the light modulation of blue light by image-forming element 21 described above refers to the state in which blue light is projected from projection lens 23 due to the reflection of irradiated light toward projection lens 23 by image-forming element 21 in the B (blue) interval shown in FIG. 5(a) and irradiated light is not reflected toward projection lens 23 by image-forming element 21 in other intervals. In the state in which image-forming element 21 does not reflect irradiated light toward projection lens 23, light is not emitted from projection lens 23 and the projected picture is therefore a black image.

As shown in the example shown in FIG. 5(e), when color separation wheel 18 before adjustment is rotated advanced by phase (rotation angle) that corresponds to interval T22 with respect to the picture signal, red light that is transmitted through the red filter (R) and yellow light that is transmitted through yellow filter (Y) are irradiated upon image-forming element 21 in interval T21 in which red light is subjected to light modulation. As a result, the red light and yellow light are color-mixed and the color purity therefore drops.

As described hereinabove, the phase (rotation angle) of color separation wheel 18 is adjusted by moving the position of second photo-interrupter 31 such that the color of light that is projected from projection lens 23 is measured by color detector 4 and the chromaticity value supplied from color detector 4 becomes a predetermined value. More specifically, the position of second photo-interrupter 31 is moved such that the chromaticity value measured at color detector 4 becomes point R (the x value is the maximum) in FIG. 4.

Thus, as shown in FIG. 5(d), the detection time of second reflective marker 30 coincides with the start position (start time) of interval B, whereby light modulation by image-forming element 21 can be synchronized with the color separation realized by color separation wheel 18.

As described hereinabove, the yellow region that emits light of the yellow wavelength band occupies a larger area of light-emitting wheel 16 than the blue region that reflects light of the blue wavelength band. As a result, the rotation timing adjustment of color separation wheel 18 is not influenced even when light-emitting wheel 16 is rotated delayed by phase (rotation angle) that corresponds to interval T12 with respect to the picture signal as shown in FIG. 5(c).

Similarly, when light-emitting wheel 16 before adjustment is rotated delayed by phase (rotation angle) that corresponds to interval T12 with respect to the picture signal, yellow light that is transmitted through the yellow filter (Y) and blue light that is transmitted through blue filter (B) are irradiated upon image-forming element 21 in interval T11 in which blue light is subjected to light modulation. As a result, the blue light and yellow light are color-mixed and the color purity therefore drops.

The phase (rotation angle) of light-emitting wheel 16 is adjusted by moving the position of first photo-interrupter 25 such that the color of light projected from projection lens 23 is measured at color detector 4 and the chromaticity value that is supplied from color detector 4 becomes a predetermined value. More specifically, the position of first photo-interrupter 25 is moved such that the chromaticity value that is measured at color detector 4 becomes point B (the x value is a minimum) in FIG. 4.

As a result, the detection time of first reflective marker 24 coincides with the start position (start time) of interval B as shown in FIG. 5(b), whereby the light modulation of the light of each color by the image-forming element can be synchronized with the light output realized by light-emitting wheel 16.

Figure 6:
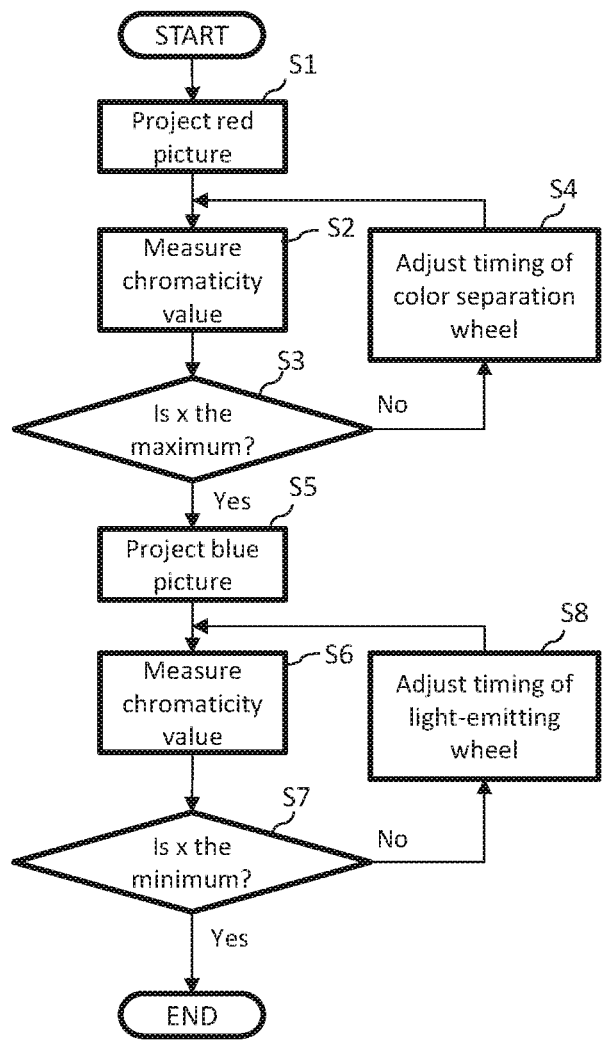
FIG. 6 is a flow chart showing an example of the processing procedures of the timing adjustment method of the present invention.

FIG. 6 is a flow chart showing an example of the processing procedure of the synchronizing adjustment method of the present invention.

In the present invention, as described hereinabove, the rotation timing of color separation wheel 18 is first adjusted with respect to the light modulation realized by image-forming element 21 to synchronize light modulation and color separation, following which the rotation timing of light-emitting wheel 16 is adjusted with respect to the light modulation realized by image-forming element 21 to synchronize light modulation and light output by light-emitting wheel 16.

An example is next described in which an information processing device (computer) that realizes the functions of first color judging unit 2 and second color judging unit 3 is connected to projection-type display device 1. This example enables switching between a picture signal and a light modulation operation by the computer in concert with the timing adjustment of color separation wheel 18 and light-emitting wheel 16. The switching between the picture signal that is applied as input to projection-type display device 1 and the light modulation operation can also be a manual operation carried out by an operator.

As shown in FIG. 6, a computer first causes a picture (red picture) to be projected from projection-type display device 1 (Step S1). The red picture can be projected by reflecting only red picture light in the direction of projection lens 23 by means of image-forming element 21.

When the picture that is projected from projection-type display device 1 is photo-detected by color detector 4, color detector 4 measures the color of the light that was photo-detected (Step S2) and supplies the chromaticity value. If the light modulation of red light that is realized by image-forming element 21 and the color separation that is realized by color separation wheel 18 are here synchronized, the chromaticity value supplied from color detector 4 is a value that indicates point R of FIG. 4. On the other hand, if the light modulation of the red light by image-forming element 21 is not synchronized with the color separation realized by color separation wheel 18, the chromaticity value that is supplied from color detector 4 moves from point R of FIG. 4 in the direction of point B or point G.

By functioning as second color determination unit 6, the computer determines whether or not the value of x of the chromaticity value that is supplied from color detector 4 is the maximum (Step S3).

If the value of x is not the maximum, the computer (second color determination unit 6) sends a control signal to second timing adjustment unit 3 for moving second photo-interrupter 31 to execute the timing adjustment of color separation wheel 18 and then returns to the process of Step S2 to repeat the processes of Steps S2-S4.

On the other hand, if the value of x of the chromaticity value that is supplied from color detector 4 in the process of Step S3 is determined to be the maximum, the computer proceeds to the process of Step S5 and causes the picture of the blue light (the blue picture) from projection-type display device 1 to be projected.

When the picture that is projected from projection-type display device 1 is received at color detector 4, color detector 4 measures the color of the received light (Step S6) and supplies the chromaticity value as output. If the light output by light-emitting wheel 16 is here synchronized with the light modulation of the blue light that is realized by image-forming element 21, the chromaticity value supplied from color detector 4 is a value that indicates point B of FIG. 4. On the other hand, if the light output by light-emitting wheel 16 is not synchronized with the light modulation of blue light realized by image-forming element 21, the chromaticity value supplied from color detector 4 moves from point B in the direction of point R or point G of FIG. 4.

By functioning as first color determination unit 5, the computer judges whether or not the value of x of the chromaticity value that is supplied from color detector 4 is the minimum (Step S7).

If the value of x is not the minimum, the computer (first color determination unit 5) sends a control signal to first timing adjustment unit 2 for moving first photo-interrupter 25 to execute the timing adjustment of light-emitting wheel 16 (Step S8) and then returns to the process of Step S6 to repeat the processes of Steps S6-S8.

On the other hand, if the value of x of the chromaticity value that is supplied from color detector 4 is determined to be the minimum in the process of Step S7, the computer ends the process.

According to the present exemplary embodiment, first color determination unit 5 and second color determination unit 6 (control units) adjust the rotation timing of light-emitting wheel 16 with respect to light modulation after having adjusted the rotation timing of color separation wheel 18 with respect to the light modulation on the basis of the output of color detection unit (light detection unit) 4. As described hereinabove, if the rotation timing of light-emitting wheel 16 is adjusted earlier, the rotation timing of light-emitting wheel 16 must again be adjusted after having adjusted the rotation timing of color separation wheel 18. In contrast, this redundant process of adjusting the timing of light-emitting wheel 16 need not be executed in the present exemplary embodiment. Accordingly, the timing rotation of light-emitting wheel 16 and color separation wheel 18 can be easily adjusted with respect to the light modulation for light of each color by image-forming element 21.

In the present exemplary embodiment, moreover, the already existing reflective marker, photo-interrupter, and color detector are used to adjust the rotation angle of light-emitting wheel 16 and color separation wheel 18, whereby the light modulation for the light of each color realized by image-forming element 21, light output by light-emitting wheel 16, as well as color separation realized by color separation wheel 18 can be easily synchronized by means of a simple configuration.

Second Exemplary Embodiment

FIG. 7 is a block diagram showing an example of the configuration of the projection-type display system of the second exemplary embodiment.

In the first exemplary embodiment, an example of a configuration was shown in which the timing of light output by light-emitting wheel 16 as well as the color separation by color separation wheel 18 were adjusted by physically (mechanically) moving first photo-interrupter 25 and second photo-interrupter 31.

The projection-type display system of the second exemplary embodiment is of a configuration that is provided with, in place of first color determination unit 5 and second color determination unit 6 that were shown in the first exemplary embodiment, CPU unit 37 that executes processing in accordance with a program and nonvolatile memory unit 36 that saves information that was processed in CPU unit 37.

In the second exemplary embodiment, a configuration is shown for adjusting the timing of the light output realized by light-emitting wheel 16 as well as the color separation realized by color separation wheel 18 by electrically delaying the synchronizing signals that indicate the detection timing of first reflective marker 24 by first photo-interrupter 25 as well as the detection timing of second reflective marker 30 by second photo-interrupter 31.

As shown in FIG. 7, the projection-type display system of the second exemplary embodiment is of a configuration that is provided with, in place of first color determination unit 5 and second color determination unit 6 that were shown in the first exemplary embodiment, CPU unit 37 that executes processing in accordance with a program and nonvolatile memory unit 36 that saves information that was processed in CPU unit 37. In addition, projection-type display device 7 of the second exemplary embodiment differs from the projection-type display system of the first exemplary embodiment regarding the configuration of first wheel control unit 9 that controls the rotation movement of light-emitting wheel 16 and second wheel control unit 10 that controls the rotation movement of color separation wheel 18.

CPU unit 37 and memory unit 36 shown in FIG. 7 may be realized by an information processing device (a computer). The computer realizes the functions of CPU unit 37 and memory unit 36 of the present exemplary embodiment by executing processes in accordance with a program. When CPU unit 37 and memory unit 36 are connected to projection-type display device 7, a configuration is realized that, similar to an information processing device (computer) that realizes the functions of first color judging unit 2 and second color judging unit 3 shown in the first exemplary embodiment, enables switching between a picture signal and a light modulation operation in accordance with the timing adjustment of color separation wheel 18 and light-emitting wheel 16.

First wheel control unit 9 of the second exemplary embodiment is provided with: first drive motor 29 that causes rotation of light-emitting wheel 16, first detection circuit 26 that uses first photo-interrupter (first detector) 25 to detect first reflective marker (first detected portion) 24 that is provided on light-emitting wheel 16; first delay circuit 27 that delays the signal that is supplied from first detection circuit 26 in accordance with a control signal from CPU unit 37; and first motor control circuit 28 that causes first drive motor 29 to operate on the basis of the output signal of first delay circuit 27 and a picture synchronizing signal that is applied as input from the outside together with the picture signal. First photo-interrupter (first detector) 25, similar to the first exemplary embodiment, is a sensor in which a light-emitting element and a photo-detection element are integrated, in which light emitted from the above-described light-emitting element is reflected by the first reflective marker 24, and that supplies a signal when this reflected light is photo-detected by the photo-detection element. Upon detecting the signal supplied from the photo-detection element of first photo-interrupter 25, first detection circuit 26 supplies the signal to first delay circuit 27 as a synchronizing signal. First wheel control unit (first rotation control unit) 9 causes light-emitting wheel 16 to rotate such that the picture synchronizing signal that is received as input together with the picture signal and the output signal of first delay circuit 27 are synchronized. In other words, first motor control circuit 28 controls the rotation speed of first drive motor 29 such that the phase difference between the picture synchronizing signal (for example, a vertical synchronizing signal) and the synchronizing signal supplied from first delay circuit 27 is uniform.

Second wheel control unit 10 of the second exemplary embodiment is provided with second drive motor 35 that causes color separation wheel 18 to rotate; second detection circuit 32 that uses second photo-interrupter (second detector) 31 to detect second reflective marker (second detected portion) 30 that is provided on color separation wheel 18; second delay circuit 33 that delays the signal supplied from second detection circuit 32 in accordance with the control signal from CPU unit 37; and second motor control circuit 34 that causes second drive motor 35 to operate on the basis of the output signal of second delay circuit 33 and the picture synchronizing signal that is received as input from the outside together with the picture signal. Similar to the first exemplary embodiment, second photo-interrupter (second detector) 31, is a sensor in which a light-emitting element and a photo-detection element are integrated, in which light emitted from the above-described light-emitting element is reflected by the second reflective marker 30, and that supplies a signal upon the photo-detection of the reflected light by the photo-detection element. Upon detecting the signal that was supplied from the photo-detection element of second photo-interrupter 31, second detection circuit 32 supplies the signal to second delay circuit 33 as a synchronizing signal. Second wheel control unit (second rotation control unit) 10 causes color separation wheel 18 to rotate such that the picture synchronizing signal and the output signal of second delay circuit 33 are synchronized. In other words, second motor control circuit 34 controls the rotation speed of second drive motor 35 such that the phase difference between the picture synchronizing signal (for example, a vertical synchronizing signal) and the synchronizing signal supplied from second delay circuit 33 is uniform.

CPU unit 37 causes second delay circuit 33 to delay the detection signal of second reflective marker 30 realized by second photo-interrupter 31 and causes first delay circuit 27 to delay the detection signal of first reflective marker 24 realized by first photo-interrupter 25 such that the chromaticity value supplied from color detector 4 becomes a predetermined value. CPU unit 37 saves the delay amount of second delay circuit 33 as well as the delay amount of first delay circuit 27 that follows timing adjustment in memory unit 36 and subsequently sets the delay amounts that were saved in memory unit 36 for each operation of projection-type display device 7 in first delay circuit 27 and second delay circuit 33. The configuration and operation are otherwise similar to that of the first exemplary embodiment and redundant explanation is therefore omitted.

In the projection-type display system of the second exemplary embodiment, the delay amount of second delay circuit 33 is changed to adjust the light modulation and rotation timing of color separation wheel 18, and the delay amount of first delay circuit 27 is changed to adjust the light modulation and rotation timing of light-emitting wheel 16.

As a result, in the projection-type display system of the second exemplary embodiment, as in the first exemplary embodiment, the rotation timing of light-emitting wheel 16 and color separation wheel 18 can be easily adjusted with respect to the light modulation of the light of each color by image-forming element 21.

In addition, because the rotation angle of light-emitting wheel 16 and color separation wheel 18 are adjusted using the already existing reflective markers, photo-interrupters, and color detection units, the light modulation of light of each color by image-forming element 21, the light output realized by light-emitting wheel 16, as well as the color separation realized by color separation wheel 18 can be easily synchronized by means of a simple configuration. In particular, in the projection-type display system of the second exemplary embodiment, the need for a movable table and drive mechanism to move the first and second photo-interrupters is eliminated, resulting in a yet simpler configuration than projection-type display system of the first exemplary embodiment.

In the above-described first exemplary embodiment and second exemplary embodiment, examples of configurations were shown in which first and second reflective markers and first and second photo-interrupters are used to optically detect reference positions of light-emitting wheel 16 and color separation wheel 18, but the reference positions of light-emitting wheel 16 and color separation wheel 18 may also be detected using, for example, elements that employ magnetic coupling such as Hall elements.

Further, in the above-described first exemplary embodiment, an example of a configuration was shown in which the phases (rotation angles) of light-emitting wheel 16 and color separation wheel 18 are adjusted by moving the positions of first and second photo-interrupters, but a configuration is also possible in which the first and second photo-interrupters are fixed and the positions of the first and second reflective markers are moved.

Still further, although examples of configurations were shown in the above-described first exemplary embodiment and second exemplary embodiment in which color detector (light detection unit) 4 was arranged outside the projection-type display device, color detector 4 can also be incorporated inside projection-type display device if color detector 4 is installed at a position for photo-detecting at least a portion (for example, the leakage light of the projected light) of the projected light produced when image-forming element 21 reflects illumination light in the direction of projection lens 23.

In this case, the control unit (second color determination unit 6 or CPU unit 37) should adjust the rotation timing of color separation wheel 18 with respect to light modulation such that, during a state in which image-forming element 21 supplies light toward the light detection unit in the display intervals of a third picture that corresponds to light of only the above-described third wavelength band that is contained in the picture signal and does not supply light toward the light detection unit in intervals other than the display intervals of the third picture, the color detected by the light detection unit is the color that corresponds to the third wavelength band. Further, the control unit (second color determination unit 6 or CPU unit 37) should adjust the rotation timing of light-emitting wheel 16 with respect to light modulation such that, during a state in which image-forming element 21 supplies light toward the light detection unit in display intervals of the first picture that corresponds to only light of the above-described first wavelength band that is contained in the picture signal and does not supply light toward the light detection unit in intervals other than the display interval of the first picture, the color detected by the light detection unit becomes the color that corresponds to the first wavelength band.

In addition, when image-forming element 21 of a reflective type such as a DMD is used and color detector 4 is incorporated inside a projection-type display device, this color detector 4 may also be arranged at a position that receives light that is not illumination light that is reflected in the direction of projection lens 23 by image-forming element 21. In this case, for example, in Step S1 of FIG. 6, image-forming element 21 projects pictures in intervals G, B, and Y shown in FIG. 5(a) instead of projecting a picture in interval R, and in Step S5, projects pictures in red picture interval R, green picture interval G, and yellow picture interval Y instead of projecting a picture in blue picture interval B. Essentially, this color detector 4 photo-detects red light by the process of Step S1, and this color detector 4 becomes able to photo-detect blue light by the process of Step S5 and can carry out the same process as FIG. 6.

In addition, as color detector 4, an illuminance sensor can be used that measures the illuminance of the light of colors that correspond to blue light (first wavelength band) and/or red or green light (third wavelength band) that are used in the adjustment of the rotation timing of light-emitting wheel 16 and color separation wheel 18. In this case, the light of the color that corresponds to the third wavelength band should be detected to adjust the rotation timing of color separation wheel 18 and the light of the color that corresponds to the first wavelength band should be detected to adjust the rotation timing of light-emitting wheel 16 such that the illuminance value of the light of the color of the projected light becomes a maximum. Alternatively, the rotation timing of light-emitting wheel 16 and color separation wheel 18 may also be adjusted such that the illuminance value of the light of colors other than the color of the projected picture is a minimum. In addition, measurement of the illuminance of light of a predetermined color by using an illuminance sensor can be realized by providing the illuminance sensor with a color filter that corresponds to the light of the predetermined color.

In addition, each color filter that is provided in color separation wheel 18 is not limited to the example of the arrangement shown in FIG. 2. As described hereinabove, the arrangement of the positions of the red filter and green filter shown in FIG. 2 may also be switched. In this case, green light should be used in the timing adjustment of color separation wheel 18. Further, a plurality of color filters of the same color may also be provided in color separation wheel 18. For example, two green filters may be provided, and each of the color filters may be arranged in the color order of blue, green, red, green, and yellow, or two yellow filters may be provided and each of the color filters may be arranged in the color order of blue, yellow, red, yellow, and green. When the disposition of each of the color filters provided for color separation wheel 18 is changed, the order of the light colors subjected to light modulation by image-forming element 21 should be matched to the order of disposition of each of the color filters of color separation wheel 18.

Still further, the light emitted from light source 11 is not limited to blue and may also be red or green. In this case, light-emitting wheel 16 should be provided with a phosphor that emits light of a color that is necessary for the formation of a color picture and that differs from the light that is emitted from light source 11 in place of the yellow region shown in FIG. 3.

Although the invention of the present application has been described hereinabove with reference to exemplary embodiments, the invention of the present application is not limited to the above-described exemplary embodiments. The configuration and details of the invention of the present application are open to various modifications within the scope of the invention of the present application that will be clear to one of ordinary skill in the art.

The invention of the present application can adopt the form described in the following appendixes but is not limited to the forms described in these appendixes.

APPENDIX 1

A projection-type display system includes:
a light-emitting wheel that, by rotating, sequentially supplies light that is excited by light that is emitted by a light source and light that is the transmission or reflection of light that is emitted by said light source;
a color separation wheel that, by rotating, sequentially color-separates and supplies light that is supplied by the light-emitting wheel;
an image-forming element that, in accordance with a picture signal, performs light modulation of light supplied by the color separation wheel;
a light detection unit that detects light that has undergone the light modulation; and
a control unit that, on the basis of the output of the light detection unit, adjusts the light modulation and rotation timing of the light-emitting wheel after adjusting the light modulation and rotation timing of the color separation wheel.

APPENDIX 2

In the projection-type display system as described in Appendix 1:
when the wavelength of the light emitted by the light source is taken as the first wavelength band and the wavelength of the light excited by the light emitted by the light source is taken as the second wavelength band,
the color separation wheel has at least a first region that emits light of the first wavelength band and a third region that separates light of a third wavelength band that is included in the second wavelength band; and
the first region and the third region are not adjacent.

APPENDIX 3

In the projection-type display system as described in Appendix 2:
the control unit adjusts the light modulation and rotation timing of the color separation wheel on the basis of the color that corresponds to the third wavelength band and adjusts the light modulation and rotation timing of the light-emitting wheel on the basis of the color that corresponds to the first wavelength band.

APPENDIX 4

In the projection-type display system as described in Appendix 2 or 3:
the color detection unit detects light of an image that is projected;
when a picture signal that projects an image of only color that corresponds to the third wavelength band is applied as input to the image-forming element, the control unit adjusts the light modulation and rotation timing of the color separation wheel such that the color detected by the light detection unit becomes the color that corresponds to the third wavelength band; and
when a picture signal that projects an image of only the color that corresponds to the first wavelength band is applied as input to the image-forming element, the control unit adjusts the light modulation and rotation timing of the light-emitting wheel such that the color detected by the light detection unit becomes the color that corresponds to the first wavelength band.

APPENDIX 5

In the projection-type display system as described in Appendix 2 or 3:
at the time of a state in which the image-forming element supplies light toward the light detection unit in display intervals of a third picture that corresponds to light of only the third wavelength band that is contained in the picture signal and does not supply light toward the light detection unit in intervals other than the display intervals of the third picture, the control unit adjusts the light modulation and rotation timing of the color separation wheel such that the color detected by the light detection unit becomes the color that corresponds to the third wavelength band; and at the time of a state in which the image-forming element supplies light toward the light detection unit in display intervals of a first picture that corresponds to light of only the first wavelength band that is contained in the picture signal and does not supply light toward the light detection unit in intervals other than the display intervals of the first picture, the control unit adjusts the light modulation and rotation timing of the light-emitting wheel such that the color detected by the light detection unit becomes the color that corresponds to the first wavelength band.

APPENDIX 6

In the projection-type display system as described in any one of Appendixes 2 to 5:
the color that corresponds to the first wavelength band is blue, and the color that corresponds to the third wavelength band is red or green.

APPENDIX 7

In the projection-type display system as described in any one of Appendixes 2 to 6:
the color separation wheel further has a second region and fourth region that are adjacent to the third region, that each supply a wavelength band that is contained in the second wavelength band, and moreover, that contain a wavelength other than the third wavelength band; and the second region, third region, and fourth region are irradiated by light that is supplied by the light-emitting wheel that is excited by light that is emitted by the light source.

APPENDIX 8

The projection-type display system as described in any one of Appendixes 1 to 7 is further provided with:
a first detected portion that is fixed to the light-emitting wheel;
a second detected portion that is fixed to the color separation wheel;
a first detection unit that, upon detecting the first detected portion, supplies a signal and that is movable along the direction of rotation of the light-emitting wheel; and
a second detection unit that, upon detecting the second detected portion, supplies a signal and that is movable along the direction of rotation of the color separation wheel; and
the control unit moves the second detection unit to adjust the light modulation and rotation timing of the color separation wheel and moves the first detection unit to adjust the light modulation and rotation timing of the light-emitting wheel.

APPENDIX 9

The projection-type display system as described in any one of Appendixes 1 to 7 is further provided with:
a first detected portion that is fixed to the light-emitting wheel;
a second detected portion that is fixed to the color separation wheel;
a first detection unit that, upon detecting the first detected portion, supplies a signal;
a second detection unit that, upon detecting the second detected portion, supplies a signal;
a first delay circuit that delays the output signal of the first detection unit;
a second delay circuit that delays the output signal of the second detection unit; and
the control unit changes the delay amount of the second delay circuit to adjust the light modulation and rotation timing of the color separation wheel and changes the delay amount of the first delay circuit to adjust the light modulation and rotation timing of the light-emitting wheel.

APPENDIX 10

In the projection-type display system as described in any one of Appendixes 1 to 9:
the light-emitting wheel, the color separation wheel, and the image-forming element are provided inside a projection-type display device; and
the light detection unit and the control unit are outside the projection-type display device.

APPENDIX 11

In the projection-type display system as described in Appendix 10:
the light detection unit is arranged at a position to detect a projected picture; and the control unit is arranged at a position that differs from the position at which the light detection unit is arranged.

APPENDIX 12

A projection-type display device is provided with:
a light-emitting wheel that, by rotating, sequentially supplies light that is excited using light that is emitted by a light source and light that is the transmitted or reflected using light that is emitted by the light source;
a color separation wheel that, by rotating, sequentially color-separates and supplies light that is supplied by the light-emitting wheel; and
an image-forming element that, in accordance with a picture signal, performs light modulation of light that is supplied by the color separation wheel; and
on the basis of the output of a light detection unit that detects light that has undergone the light modulation, the light modulation and rotation timing of the light-emitting wheel being adjusted after the light modulation and rotation timing of the color separation wheel have been adjusted.

APPENDIX 13

A timing adjustment method has steps of:
a light-emitting wheel that, by rotating, sequentially supplying light that is excited by light that is emitted by a light source and light that is the transmission or reflection of light that is emitted by said light source;
a color separation wheel, by rotating, sequentially color-separating and supplying light that is supplied by the light-emitting wheel;

an image-forming element, in accordance with a picture signal, performing light modulation of light that is supplied by the color separation wheel;

a light detection unit detecting light that has undergone the light modulation; and on the basis of output of the light detection unit, adjusting the light modulation and rotation timing of the color separation wheel and then, on the basis of output of the light detection unit, adjusting the light modulation and rotation timing of the light-emitting wheel.

APPENDIX 14

In the timing adjustment method as described in Appendix 13:

when the wavelength of light emitted by the light source is taken as the first wavelength band and the wavelength of the light that is excited by the light that is emitted by the light source is taken as the second wavelength band, the color separation wheel has at least a first region that supplies light of the first wavelength band and a third region that separates light of a third wavelength band that is contained in the second wavelength band, and the first region and third region are not adjacent.

APPENDIX 15

In the timing adjustment method as described in Appendix 14:

the light detection unit detects light of an image that is projected;

when the picture signal that projects an image of only the color that corresponds to the third wavelength band is applied as input to the image-forming element, the light modulation and rotation timing of the color separation wheel are adjusted such that the color detected by the light detection unit becomes the color that corresponds to the third wavelength band; and when the picture signal that projects an image of only the color that corresponds to the first wavelength band is applied as input to the image-forming element, the light modulation and rotation timing of the light-emitting wheel are adjusted such that the color detected by the light detection unit becomes the color that corresponds to the first wavelength band.

APPENDIX 16

In the timing adjustment method as described in Appendix 14 or 15:

the color that corresponds to the first wavelength band is blue, and the color that corresponds to the third wavelength band is red or green.

APPENDIX 17

In the timing adjustment method as described in any one of Appendixes 13 to 16:

a first detected portion is fixed to the light-emitting wheel;
a second detected portion is fixed to the color separation wheel;
a first detection unit, upon detecting the first detected portion, supplies a signal;
a second detection unit, upon detecting the second detected portion, supplies a signal; and
moving the second detection unit adjusts the light modulation and rotation timing of the color separation wheel, and moving the first detection unit adjusts the light modulation and rotation timing of the light-emitting wheel.

APPENDIX 18

In the timing adjustment method as described in any one of Appendix 13 to 16:

a first detected portion is fixed to the light-emitting wheel;
a second detected portion is fixed to the color separation wheel;
a first detection unit, upon detecting the first detected portion, supplies a signal;
a second detection unit, upon detecting the second detected portion, supplies a signal;
a first delay circuit delays the output signal of the first detection unit;
a second delay circuit delays the output signal of the second detection unit; and
changing the delay amount of the second delay circuit adjusts the light modulation and rotation timing of the color separation wheel and changing the delay amount of the first delay circuit adjusts the light modulation and rotation timing of the light-emitting wheel.

APPENDIX 19

A program causes a computer to execute procedures of:
causing a light-emitting wheel to, by rotating, sequentially output light that is excited by light that is emitted by a light source and light that is the transmitted or reflected light of light that is emitted by the light source;
causing a color separation wheel to, by rotating, sequentially color-separate and output light that is supplied by the light-emitting wheel;
causing an image-forming element to, in accordance with a picture signal, perform light modulation of light that is supplied by the color separation wheel;
causing a light detection unit to detect light that has undergone the light modulation; and
causing the light modulation and rotation timing of the color separation wheel to be adjusted on the basis of output of the light detection unit, and causing the light modulation and rotation timing of the light-emitting wheel to be adjusted on the basis of output of the light detection unit.

The invention claimed is:

1. A projection-type display system, comprising:
a light-emitting wheel that, by rotating, sequentially supplies light that is excited by light that is emitted by a light source and light that is transmission or reflection of light that is emitted by said light source;
a color separation wheel that, by rotating, sequentially color-separates and supplies light that was supplied by said light-emitting wheel;
an image-forming element that, in accordance with a picture signal, performs light modulation of light supplied by said color separation wheel;
a light detection unit that detects light that has undergone said light modulation; and
a control unit that, on a basis of an output of said light detection unit, adjusts said light modulation and a rotation timing of said light-emitting wheel after adjusting said light modulation and a rotation timing of said color separation wheel,
wherein, when a wavelength of light emitted by said light source is taken as a first wavelength band and a wavelength of light that is excited by light emitted by said light source is taken as a second wavelength band, said color separation wheel has at least a first region that supplies light of said first wavelength band and a third region that separates light of a third wavelength band that is included in said second wavelength band, and said first region and said third region are not adjacent.

2. The projection-type display system according to claim 1, wherein said control unit adjusts said light modulation and the rotation timing of said color separation wheel on a basis of a color that corresponds to said third wavelength band, and adjusts said light modulation and the rotation timing of said light-emitting wheel on a basis of a color that corresponds to said first wavelength band.

3. The projection-type display system according to claim 1, wherein said color detection unit detects light of an image that is projected,
wherein, when said picture signal that projects an image of only color that corresponds to said third wavelength band is applied as an input to said image-forming element, said control unit adjusts said light modulation and the rotation timing of said color separation wheel such that a color detected by said light detection unit becomes a color that corresponds to said third wavelength band, and
wherein, when said picture signal that projects an image of only a color that corresponds to said first wavelength band is applied as the input to said image-forming element, said control unit adjusts said light modulation and the rotation timing of said light-emitting wheel such that the color detected by said light detection unit becomes a color that corresponds to said first wavelength band.

4. The projection-type display system according to claim 1, wherein, at a time of a state in which said image-forming element supplies light toward said light detection unit in display intervals of a third picture that corresponds to light of only said third wavelength band that is contained in said picture signal and does not supply light toward said light detection unit in intervals other than the display intervals of said third picture, said control unit adjusts said light modulation and the rotation timing of said color separation wheel such that a color detected by said light detection unit becomes a color that corresponds to said third wavelength band, and
wherein, at a time of a state in which said image-forming element supplies light toward said light detection unit in display intervals of a first picture that corresponds to light of only said first wavelength band that is contained in said picture signal and does not supply light toward said light detection unit in intervals other than the display intervals of said first picture, said control unit adjusts said light modulation and the rotation timing of said light-emitting wheel such that the color detected by said light detection unit becomes a color that corresponds to said first wavelength band.

5. The projection-type display system according to 1, wherein a color that corresponds to said first wavelength band is blue, and a color that corresponds to said third wavelength band is red or green.

6. The projection-type display system according to claim 1, wherein said color separation wheel further includes a second region and a fourth region that are adjacent to said third region, that each supply a wavelength band that is contained in said second wavelength band, and that contain a wavelength other than the third wavelength band, and
wherein said second region, said third region, and said fourth region are irradiated by light that is supplied by said light-emitting wheel that is excited by light that is emitted by said light source.

7. The projection-type display system according to claim 1, further comprising:
a first detected portion that is fixed to said light-emitting wheel;
a second detected portion that is fixed to said color separation wheel;
a first detection unit that, upon detecting said first detected portion, supplies a signal and that is movable along a direction of rotation of said light-emitting wheel; and
a second detection unit that, upon detecting said second detected portion, supplies a signal and that is movable along a direction of rotation of said color separation wheel,
wherein said control unit moves said second detection unit to adjust said light modulation and the rotation timing of said color separation wheel and moves said first detection unit to adjust said light modulation and the rotation timing of said light-emitting wheel.

8. The projection-type display system according to claim 1, further comprising:
a first detected portion that is fixed to said light-emitting wheel;
a second detected portion that is fixed to said color separation wheel;
a first detection unit that, upon detecting said first detected portion, supplies a signal;
a second detection unit that, upon detecting said second detected portion, supplies a signal;
a first delay circuit that delays an output signal of said first detection unit; and
a second delay circuit that delays an output signal of said second detection unit,
wherein said control unit changes a delay amount of said second delay circuit to adjust said light modulation and the rotation timing of said color separation wheel and changes a delay amount of said first delay circuit to adjust said light modulation and a rotation timing of said light-emitting wheel.

9. The projection-type display system according to claim 1, wherein said light-emitting wheel, said color separation wheel, and said image-forming element are provided inside a projection-type display device, and
wherein said light detection unit and said control unit are outside said projection-type display device.

10. The projection-type display system according to claim 9, wherein said light detection unit is arranged at a position to detect a projected picture, and
wherein said control unit is arranged at a position that differs from the position at which said light detection unit is arranged.

11. A projection-type display device, comprising:
a light-emitting wheel, by rotating, sequentially supplies light that is excited by light that is emitted by a light source and light that is transmission or reflection of light that is emitted by said light source;
a color separation wheel that, by rotating, sequentially color-separates and supplies light that is supplied by said light-emitting wheel; and
an image-forming element that, in accordance with a picture signal, performs light modulation of light that is supplied by said color separation wheel,
wherein, on a basis of an output of a light detection unit that detects light that has undergone said light modulation, said light modulation and a rotation timing of said light-emitting wheel being adjusted after said light modulation and a rotation timing of said color separation wheel have been adjusted, and wherein, when a wavelength of light emitted by said light source is taken as a first wavelength band and a wavelength of light that is excited by light emitted by said light source is taken as a second wavelength band said color separation wheel has at least a first region that supplies light of said first wavelength band and a third region that separates light of a third wavelength band that is included in said second wavelength band, and said first region and said third region are not adjacent.

12. A timing adjustment method, comprising:

a light-emitting wheel, by rotating, sequentially supplying light that is excited by light that is emitted by a light source and light that is transmission or reflection of light that is emitted by said light source;

a color separation wheel, by rotating, sequentially color-separating and supplying light that is supplied by said light-emitting wheel;

an image-forming element, in accordance with a picture signal, performing light modulation of light that is supplied by said color separation wheel;

a light detection unit detecting light that has undergone said light modulation; and on a basis of an output of said light detection unit, adjusting said light modulation and a rotation timing of said color separation wheel and then, on a basis of output of said light detection unit, adjusting said light modulation and a rotation timing of said light-emitting wheel, wherein, when the wavelength of light emitted by said light source is taken as a first wavelength band and the wavelength of light that is excited by light that is emitted by said light source is taken as a second wavelength band, said color separation wheel has at least a first region that supplies light of said fit wavelength band and a third region that separates light of a third wavelength band that is contained in said second wavelength band, and said first region and third region are not adjacent.

13. The timing adjustment method according to claim 12, wherein said light detection unit detects light of an image that is projected, wherein, when said picture signal that projects an image of only the color that corresponds to said third wavelength band is applied as an input to said image-forming element, said light modulation and the rotation timing of said color separation wheel are adjusted such that a color detected by said light detection unit becomes a color that corresponds to said third wavelength band, and wherein, when said picture signal that projects an image of only a color that corresponds to said first wavelength band is applied as the input to said image-forming element, said light modulation and the rotation timing of said light-emitting wheel are adjusted such that the color detected by said light detection unit becomes a color that corresponds to said first wavelength band.

14. The timing adjustment method according to claim 12, wherein a color that corresponds to said first wavelength band is blue, and a color that corresponds to said third wavelength band is red or green.

15. The timing adjustment method according to claim 12, wherein a first detected portion is fixed to said light-emitting wheel, wherein a second detected portion is fixed to said color separation wheel, wherein a first detection unit, upon detecting said first detected portion, supplies a signal, wherein a second detection unit, upon detecting said second detected portion, supplies a signal, and wherein moving said second detection unit adjusts said light modulation and the rotation timing of said color separation wheel, and moving said first detection unit adjusts said light modulation and the rotation timing of said light-emitting wheel.

16. The timing adjustment method according to claim 12, wherein a first detected portion is fixed to said light-emitting wheel, wherein a second detected portion is fixed to said color separation wheel, wherein a first detection unit, upon detecting said first detected portion, supplies a signal, wherein a second detection unit, upon detecting said second detected potion, supplies a signal, wherein a first delay circuit delays the output signal of said first detection unit, wherein a second delay circuit delays the output signal of said second detection unit, and wherein changing a delay amount of said second delay circuit adjusts said light modulation and the rotation timing of said color separation wheel, and changing a delay amount of said first delay circuit adjusts said light modulation and a rotation timing of said light-emitting wheel.

* * * * *